United States Patent
Kim et al.

(10) Patent No.: US 9,362,586 B2
(45) Date of Patent: Jun. 7, 2016

(54) SECONDARY BATTERY AND METHOD OF MANUFACTURING SECONDARY BATTERY

(75) Inventors: Hyunjeong Kim, Yongin-si (KR); Andrey Matyushenko, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 1181 days.

(21) Appl. No.: 12/962,442

(22) Filed: Dec. 7, 2010

(65) Prior Publication Data

US 2011/0143189 A1    Jun. 16, 2011

(30) Foreign Application Priority Data

Dec. 7, 2009  (KR) .................. 10-2009-0120438

(51) Int. Cl.
| | |
|---|---|
| *H01M 10/02* | (2006.01) |
| *H01M 10/04* | (2006.01) |
| *H01M 2/24* | (2006.01) |
| *H01M 2/16* | (2006.01) |
| *H01M 2/30* | (2006.01) |
| *H01M 10/0583* | (2010.01) |

(52) U.S. Cl.
CPC ........ *H01M 10/0431* (2013.01); *H01M 2/1646* (2013.01); *H01M 2/30* (2013.01); *H01M 10/0436* (2013.01); *H01M 10/0583* (2013.01); *Y10T 29/49108* (2015.01)

(58) Field of Classification Search
USPC .................................................. 429/160, 211
See application file for complete search history.

(56) References Cited

U.S. PATENT DOCUMENTS

| | | | | |
|---|---|---|---|---|
| 6,461,762 | B1 * | 10/2002 | Yang et al. ..................... | 429/127 |
| 2005/0019652 | A1 * | 1/2005 | Fauteux ........................ | 429/129 |
| 2007/0154795 | A1 | 7/2007 | Kim et al. | |
| 2008/0050654 | A1 * | 2/2008 | Stevanovic ................... | 429/221 |
| 2008/0083113 | A1 * | 4/2008 | Hong ............................ | 29/623.4 |
| 2009/0053592 | A1 * | 2/2009 | Mino et al. .................... | 429/161 |
| 2009/0246612 | A1 * | 10/2009 | Naoi et al. .................... | 429/144 |
| 2009/0246640 | A1 * | 10/2009 | Bak ............................... | 429/246 |
| 2010/0015529 | A1 | 1/2010 | Kim et al. | |

FOREIGN PATENT DOCUMENTS

| | | |
|---|---|---|
| JP | 05-225983 | 9/1993 |
| JP | 2004-231797 | 8/2004 |
| KR | 10-2000-0051741 | 8/2000 |
| KR | 10-2002-0010564 | 2/2002 |

(Continued)

*Primary Examiner* — Ula C Ruddock
*Assistant Examiner* — Osei Amponsah
(74) *Attorney, Agent, or Firm* — Knobbe Martens Olson & Bear LLP

(57) ABSTRACT

A secondary battery and a method of manufacturing the secondary battery are disclosed. The secondary battery includes an electrode assembly including a positive electrode plate, a negative electrode plate, and a separator, wherein the positive electrode plate and the negative electrode plate are stacked with the separator disposed between, wherein the positive electrode plate includes a plurality of positive electrode non-coating portions including a plurality of first positive electrode bent portions at a first side of the electrode assembly, wherein the negative electrode plate includes a plurality of negative electrode non-coating portions including a plurality of first negative electrode bent portions at a second side of the electrode assembly; a positive electrode tab electrically connected to the positive electrode non-coating portion; and a negative electrode tab electrically connected to the negative electrode non-coating portion.

19 Claims, 18 Drawing Sheets

(56) References Cited

FOREIGN PATENT DOCUMENTS

| KR | 10-0719713 | 6/2007 |
| KR | 20070110563 | 11/2007 |
| WO | WO 2006118053 A1 * | 11/2006 |
| WO | WO 2007132994 A1 * | 11/2007 |

* cited by examiner

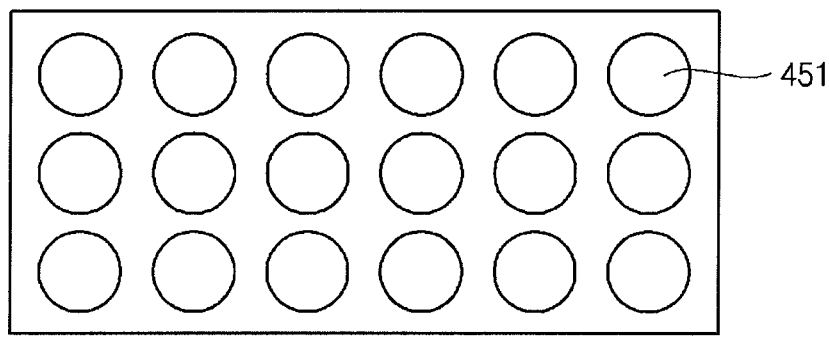
FIG. 8A
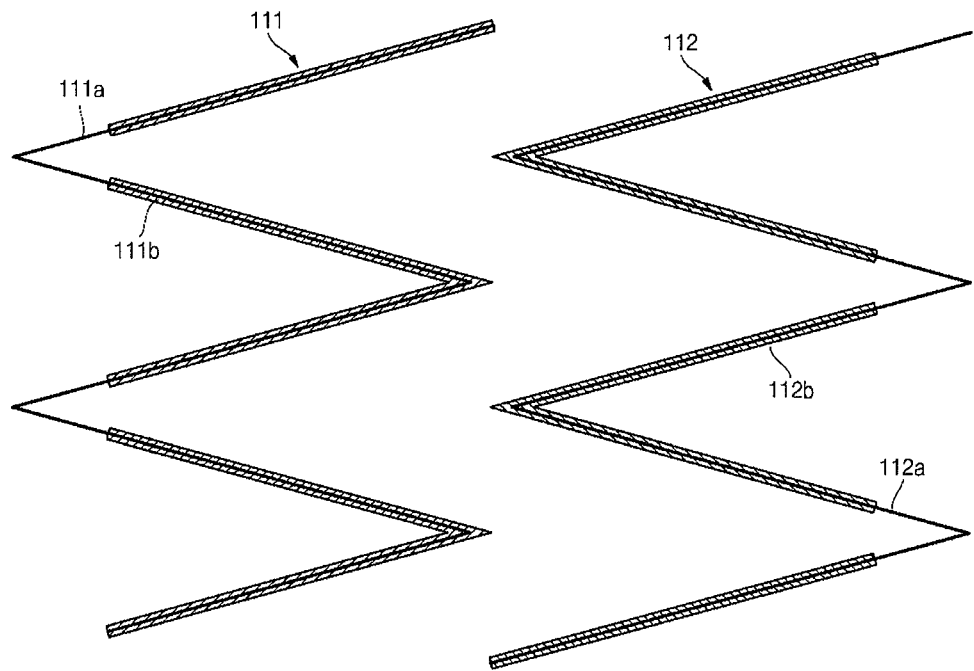

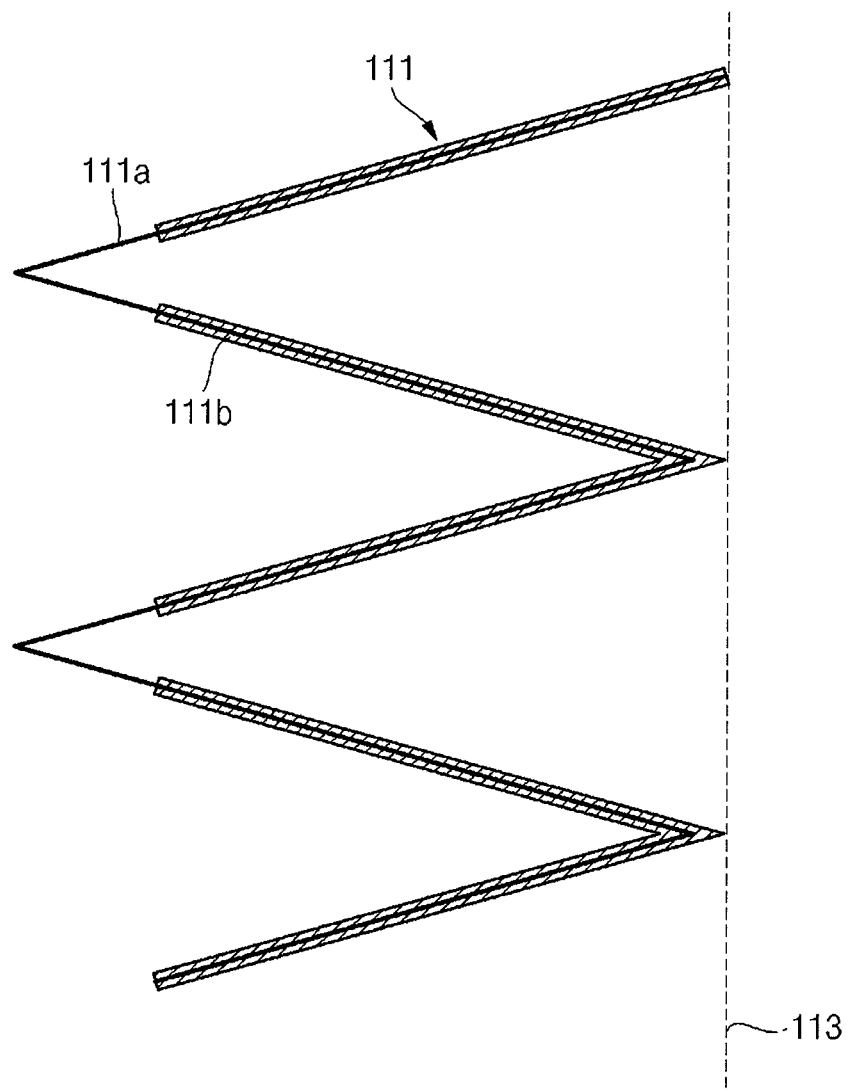

SECONDARY BATTERY AND METHOD OF MANUFACTURING SECONDARY BATTERY

CROSS-REFERENCE TO RELATED APPLICATIONS

This application claims priority to and the benefit of Korean Patent Application No. 10-2009-0120438, filed on Dec. 7, 2009, the entire content of which is incorporated herein by reference.

BACKGROUND

1. Field

Embodiments relate to a secondary battery and a method of manufacturing the secondary battery.

2. Description of the Related Technology

A secondary battery typically includes an electrode assembly arranged in a stack and a case for receiving the electrode assembly. The 'stack type' electrode assembly is typically formed by sequentially and repeatedly stacking negative electrode plates, separators, and positive electrode plates, which are cut in predetermined sizes. Such a 'stack type' electrode assembly typically includes non-coating portions disposed at sides of a positive electrode plate and a negative electrode plate, and a lead line extending from the non-coating portions and connected to an external electrode terminal. When the case of a secondary battery receives an electrode assembly, the case requires additional space for extending a lead line to the exterior of the case. Due to use of this additional space, miniaturization of a secondary battery is difficult.

SUMMARY

Embodiments are directed to a secondary battery and a method of manufacturing the secondary battery, which substantially overcome one or more of the problems due to the limitations and disadvantages of the related art.

It is therefore a feature of an embodiment to provide a secondary battery and a method of manufacturing the secondary battery, which can decrease excess space of a battery case for receiving an electrode assembly.

At least one of the above and other features and advantages may be realized by providing a secondary battery including: an electrode assembly including a positive electrode plate, a negative electrode plate, and a separator, wherein the positive electrode plate and the negative electrode plate are stacked with the separator disposed between, wherein the positive electrode plate includes a plurality of positive electrode non-coating portions including a plurality of first positive electrode bent portions at a first side of the electrode assembly, wherein the negative electrode plate includes a plurality of negative electrode non-coating portions including a plurality of first negative electrode bent portions at a second side of the electrode assembly; a positive electrode tab electrically connected to the positive electrode non-coating portion; and a negative electrode tab electrically connected to the negative electrode non-coating portion.

The positive electrode plate may have a plate shape and include the positive electrode non-coating portions at a constant interval, wherein a plurality of positive electrode active material regions are formed between the positive electrode non-coating portions, wherein the positive electrode non-coating portions and the positive electrode active material regions are alternately bent such that a plurality of second positive electrode bent portions including the bent positive electrode active material regions are disposed at the second side of the electrode assembly, wherein the negative electrode plate has a plate shape and includes the negative electrode non-coating portions at a constant interval, wherein a plurality of negative electrode active material regions are formed between the negative electrode non-coating portions, and wherein the negative electrode non-coating portions and the negative electrode active material regions are alternately bent such that a plurality of second negative electrode bent portions including the bent negative electrode active material regions are disposed at the first side of the electrode assembly. The positive electrode plate may have a plurality of plate shapes, wherein each of the plate shapes is provided with a plurality of positive electrode active material regions that are disposed at upper and lower sides of the first positive electrode bent portion, wherein the negative electrode plate has a plurality of plate shapes, wherein each of the plate shapes is provided with a plurality of negative electrode active material regions that are disposed at upper and lower sides of the first negative electrode bent portion, and wherein the positive electrode plate and the negative electrode plate are alternately stacked such that the positive electrode active material regions disposed at the upper sides overlap the negative electrode active material regions disposed at the lower sides, and such that the positive electrode active material regions disposed at the lower sides overlap the negative electrode active material regions disposed at the upper sides. The separator may have a plate shape and be bent in a zigzag shape between the positive electrode plate and the negative electrode plate electrode assembly.

The positive electrode plate may have a plurality of plate shapes, wherein each of the plate shapes is provided with a plurality of positive electrode active material regions that are disposed at upper and lower sides of the first positive electrode bent portion, wherein the negative electrode plate has a plurality of plate shapes, wherein each of the plate shapes is provided with a plurality of negative electrode active material regions that are disposed at upper and lower sides of the first negative electrode bent portion, wherein the positive electrode plate and the negative electrode plate are alternately stacked such that the positive electrode active material regions disposed at the upper sides overlap the negative electrode active material regions disposed at the lower sides, and such that the positive electrode active material regions disposed at the lower sides overlap the negative electrode active material regions disposed at the upper sides. The separator may have a plate shape and be bent in a zigzag shape between the positive electrode plate and the negative electrode plate.

The separator may be disposed only in a region where the positive electrode active material region faces the negative electrode active material region. The separator may be adhered to the positive electrode active material region by an adhesive. The adhesive may include an ion passage that passes through an upper surface and a lower surface of the adhesive. The positive electrode tab may be welded or riveted to the positive electrode non-coating portion, and the negative electrode tab may be welded or riveted to the negative electrode non-coating portion.

The positive electrode tab may be welded or riveted to the positive electrode non-coating portions, and the negative electrode tab may be welded or riveted to the negative electrode non-coating portions. The secondary battery may further include a battery case that exposes a portion of the positive electrode tab and a portion of the negative electrode tab to an exterior of the battery case and receives the electrode assembly.

At least one of the above and other features and advantages may be realized by providing a method of manufacturing a secondary battery, the method including: preparing an electrode assembly including a positive electrode plate, a negative electrode plate, a separator, a plurality of positive electrode non-coating portions, and a plurality of negative electrode non-coating portions, wherein the positive electrode plate and the negative electrode plate are stacked with the separator disposed in between, wherein a plurality of first positive electrode bent portions of the positive electrode non-coating portions are disposed at a first side of the electrode assembly, wherein a plurality of first negative electrode bent portions of the negative electrode non-coating portions are disposed at a second side of the electrode assembly; electrically connecting a positive electrode tab and a negative electrode tab to the positive electrode non-coating portion and the negative electrode non-coating portion, respectively; storing the electrode assembly in a battery case; and exposing a portion of the positive electrode tab and a portion of the negative electrode tab to an exterior of the battery case.

Preparing the electrode assembly may comprise: providing the positive electrode non-coating portions at a constant interval on the positive electrode plate, wherein a plurality of positive electrode active material regions are formed between the positive electrode non-coating portions, wherein the positive electrode non-coating portions and the positive electrode active material regions are alternately bent such that a plurality of second positive electrode bent portions including the bent positive electrode active material regions are disposed at the second side of the electrode assembly; providing the negative electrode non-coating portions at a constant interval on the negative electrode plate, wherein a plurality of negative electrode active material regions are formed between the negative electrode non-coating portions, wherein the negative electrode non-coating portions and the negative electrode active material regions are alternately bent such that a plurality of second negative electrode bent portions including the bent negative electrode active material regions are disposed at the first side of the electrode assembly; and bending the separator in a zigzag shape between the positive electrode plate and the negative electrode plate, wherein the separator has a plate shape.

Preparing the electrode assembly may comprise: configuring the positive electrode plate to have a plurality of plate shapes; providing a plurality of positive electrode active material regions on each of the plate shapes such that the positive electrode active material regions are disposed at upper and lower sides of the first positive electrode bent portion; configuring the negative electrode plate to have a plurality of plate shapes; providing a plurality of negative electrode active material regions on each of the plate shapes such that the negative electrode active material regions are disposed at upper and lower sides of the first negative electrode bent portion; alternately stacking the positive electrode plate and the negative electrode plate such that the positive electrode active material regions disposed at the upper sides overlap the negative electrode active material regions disposed at the lower sides, and such that the positive electrode active material regions disposed at the lower sides overlap the negative electrode active material regions disposed at the upper sides; and disposing the separator only in a region where the positive electrode active material region faces the negative electrode active material region.

BRIEF DESCRIPTION OF THE DRAWINGS

The above and other features and advantages will become more apparent to those of ordinary skill in the art by describing in detail embodiments with reference to the attached drawings, in which:

FIG. 7 is a plan view illustrating adhesive of FIG. 6;

FIGS. 8A through 8F are cross-sectional views illustrating a method of manufacturing the secondary battery according the embodiment of FIG. 1;

DETAILED DESCRIPTION

Example embodiments will now be described more fully hereinafter with reference to the accompanying drawings; however, they may be embodied in different forms and should not be construed as limited to the embodiments set forth herein.

First, a secondary battery according to an embodiment will be described with reference to FIGS. 1 and 2.

Figure 1:
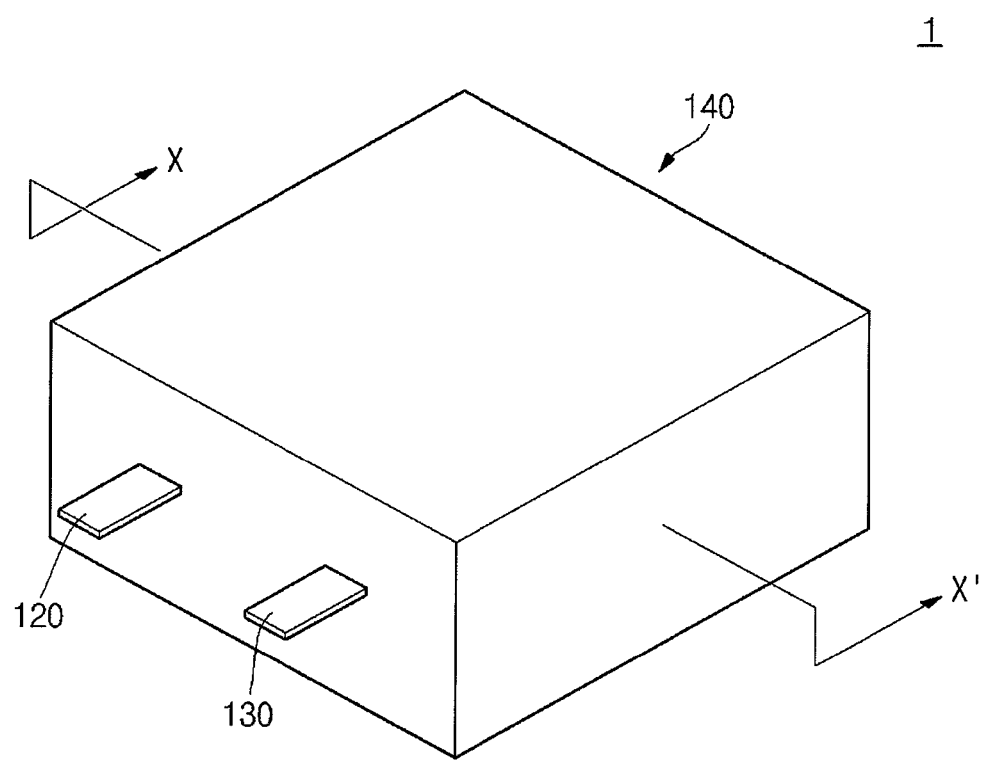
FIG. 1 is a perspective view illustrating a secondary battery according to an embodiment.

FIG. 1 is a perspective view illustrating a secondary battery according to an embodiment. FIG. 2 is a cross-sectional view taken along line X-X' of FIG. 1 without a battery case.

Figure 2:
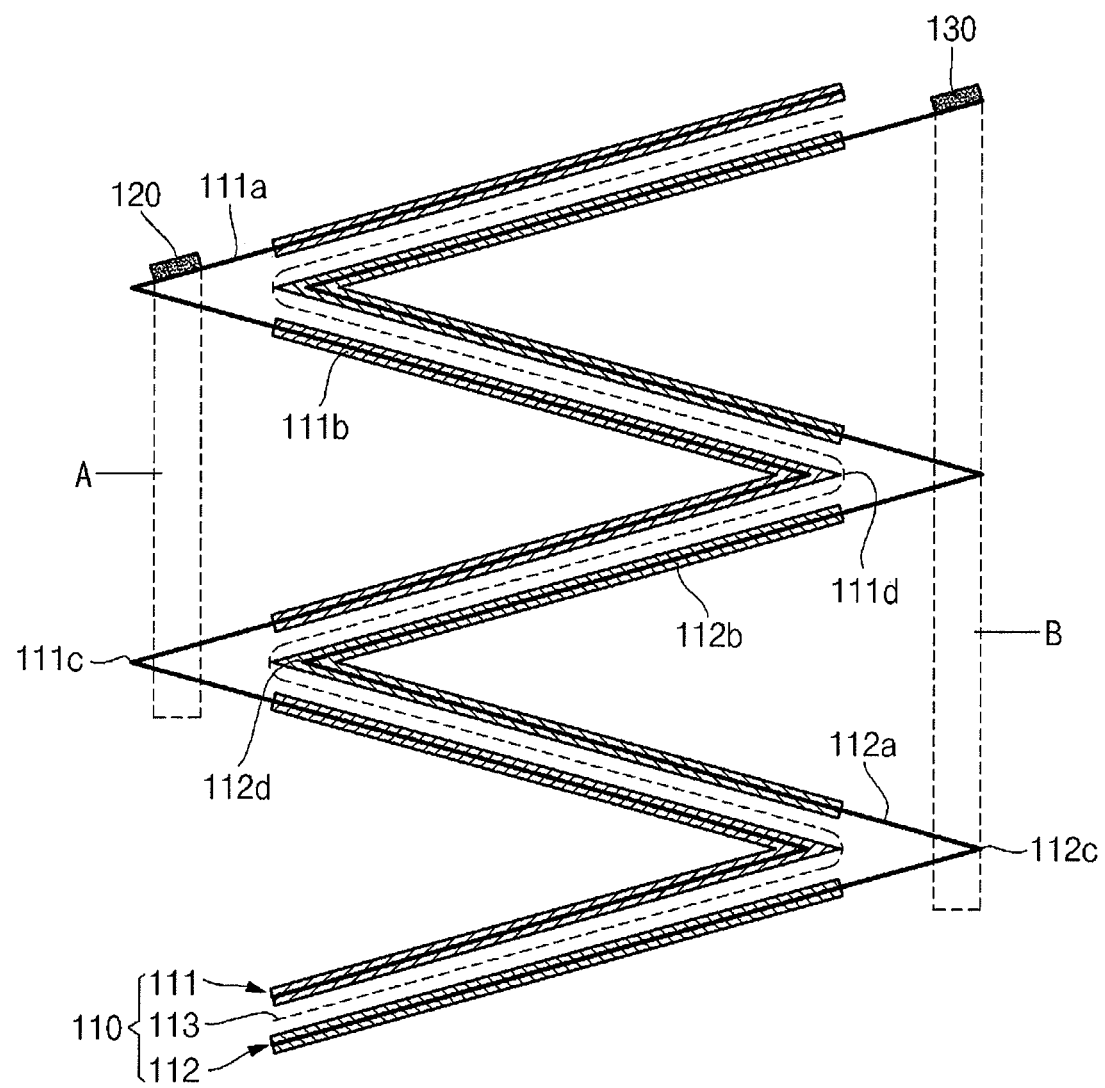
FIG. 2 is a cross-sectional view taken along line X-X' of FIG. 1 without a battery case.

Referring to FIGS. 1 and 2, a secondary battery 1 includes an electrode assembly 110, a positive electrode tab 120, a negative electrode tab 130, and a battery case 140.

The electrode assembly 110 may include a positive electrode plate 111, a negative electrode plate 112, and a separator 113 disposed between the positive electrode plate 111 and the negative electrode plate 112. The electrode assembly 110 may be formed by stacking the positive electrode plate 111, the negative electrode plate 112, and the separator 113.

A side of the electrode assembly 110 may be provided with bent sides of positive electrode non-coating portions 111a. Another side of the electrode assembly 110 may be provided with bent sides of negative electrode non-coating portions 112a. The electrode assembly 110 may be formed by bending the positive electrode plate 111, the negative electrode plate 112, and the separator 113 in a zigzag shape. That is, the electrode assembly 110 may be formed by sequentially disposing the separator 113 and the second electrode plate 112 on the upper portion of the positive electrode plate 111, by bending the positive electrode plate 111, the separator 113, and the second electrode plate 112 from one side, and then bending the positive electrode plate 111, the separator 113, and the second electrode plate 112 from another side.

The positive electrode plate 111 may be a single plate and can include positive electrode non-coating portions 111a spaced a constant distance from each other, and positive electrode active material regions 111b may be formed by coating the positive electrode plate 111 with positive electrode active materials between the positive electrode non-coating portions 111a. The positive electrode plate 111 can have a zigzag shape that is formed by alternately bending the positive electrode non-coating portions 111a and the positive electrode active material regions 111b. That is, the positive electrode plate 111 may include first positive electrode bent portions 111c formed by bending the positive electrode non-coating portions 111a, and second positive electrode bent portions 111d formed by bending the positive electrode active material regions 111b. In more detail, the first positive electrode bent portions 111c may be formed by bending the centers of the positive electrode non-coating portions 111a, and the second positive electrode bent portions 111d may be formed by bending the centers of the positive electrode active material regions 111b. In this case, the centers are the central parts of the positive electrode non-coating portions 111a or the positive electrode active material regions 111b in the longitudinal direction of the positive electrode plate 111. The positive electrode plate 111 may be formed by bending the first positive electrode bent portions 111c and the second positive electrode bent portions 111d to be vertically arranged.

The negative electrode plate 112 may be a single plate and can include negative electrode non-coating portions 112a spaced a constant distance from each other, and negative electrode active material regions 112b may be formed by coating the negative electrode plate 112 with negative electrode active materials between the negative electrode non-coating portions 112a. That is, the negative electrode plate 112 may include first negative electrode bent portions 112c formed by bending the negative electrode non-coating portions 112a and second negative electrode bent portions 112d formed by bending the negative electrode active material regions 112b. In more detail, the first negative electrode bent portions 112d formed by bending the centers of the negative electrode non-coating portions 112a, and the second negative electrode bent portions 112d may be formed by bending the centers of the negative electrode active material regions 112b. In this case, the centers are the central parts of the negative electrode non-coating portions 112a or the negative electrode active material regions 112b in the longitudinal direction of the negative electrode plate 112. The negative electrode plate 112 may be formed by bending the first negative electrode bent portions 112c and the second negative electrode bent portions 112d to be vertically arranged. The positive electrode plate 111 and the negative electrode plate 112 are stacked such that the negative electrode active material regions 112b can face the positive electrode active material regions 111b.

The separator 113 may be disposed between the positive electrode plate 111 and the second electrode plate 112. The separator 113 may be a typical separator used in a secondary battery. The separator 113 may be a ceramic layer, e.g., a porous layer including materials such as $Al_2O_3$, $BaTiO_4$, or $TiO_2$. The separator 113 may be a single plate that is bent in a zigzag shape between the positive electrode plate 111 and the second electrode plate 112. To protect the separator 113 against heat generated from a process of connecting the positive electrode tab 120 and the negative electrode tab 130 to the positive electrode non-coating portion 111a and the negative electrode non-coating portion 112a, respectively, the separator 113 may be spaced apart, without a contact, from the first positive electrode bent portions 111c of the positive electrode non-coating portions 111a and the first negative electrode bent portions 112c of the negative electrode non-coating portions 112a, or the separator 113 may be in close contact with the second positive electrode bent portions 111d of the positive electrode active material regions 111b and the second negative electrode bent portions 112d of the negative electrode active material regions 112b.

The positive electrode tab 120 may be electrically connected to the positive electrode non-coating portion 111a. The positive electrode tab 120 may be connected to the positive electrode non-coating portion 111a at an uppermost portion of the electrode assembly 110. According to an embodiment, the positive electrode tab 120 may be electrically connected to the positive electrode non-coating portions 111a. In this case, the positive electrode tab 120 may be coupled to the positive electrode non-coating portions 111a at positions A that are vertically the same on the positive electrode non-coating portions 111a as illustrated in FIG. 2. The positive electrode tab 120 may be connected to one or more of the positive electrode non-coating portions 111a through welding or rivet coupling. The negative electrode tab 130 may be electrically connected to the negative electrode non-coating portion 112a. The negative electrode tab 130 may be connected to the negative electrode non-coating portion 112a at an uppermost portion of the electrode assembly 110. According to an embodiment, the negative electrode tab 130 may be electrically connected to the negative electrode non-coating portions 112a. In this case, the negative electrode tab 130 may be coupled to the negative electrode non-coating portions 112a at positions B that are vertically the same on the negative electrode non-coating portions 112a as illustrated in FIG. 2. The negative electrode tab 130 may be connected to one or more of the negative electrode non-coating portions 112a through welding or rivet coupling.

According to an embodiment, the battery case 140 exposes one portion of the positive electrode tab 120 and one portion of the negative electrode tab 130, and accommodates the electrode assembly 110.

In the secondary battery 1, the positive electrode non-coating portion 111a may be directly connected to the positive electrode tab 120, and the negative electrode non-coating portion 112a may be directly connected to the negative electrode tab 130, so as to eliminate space that would otherwise be taken by a lead line, thus miniaturizing the battery case 140.

A secondary battery according to another embodiment will now be described with reference to FIGS. 3 and 4.

Figure 3:
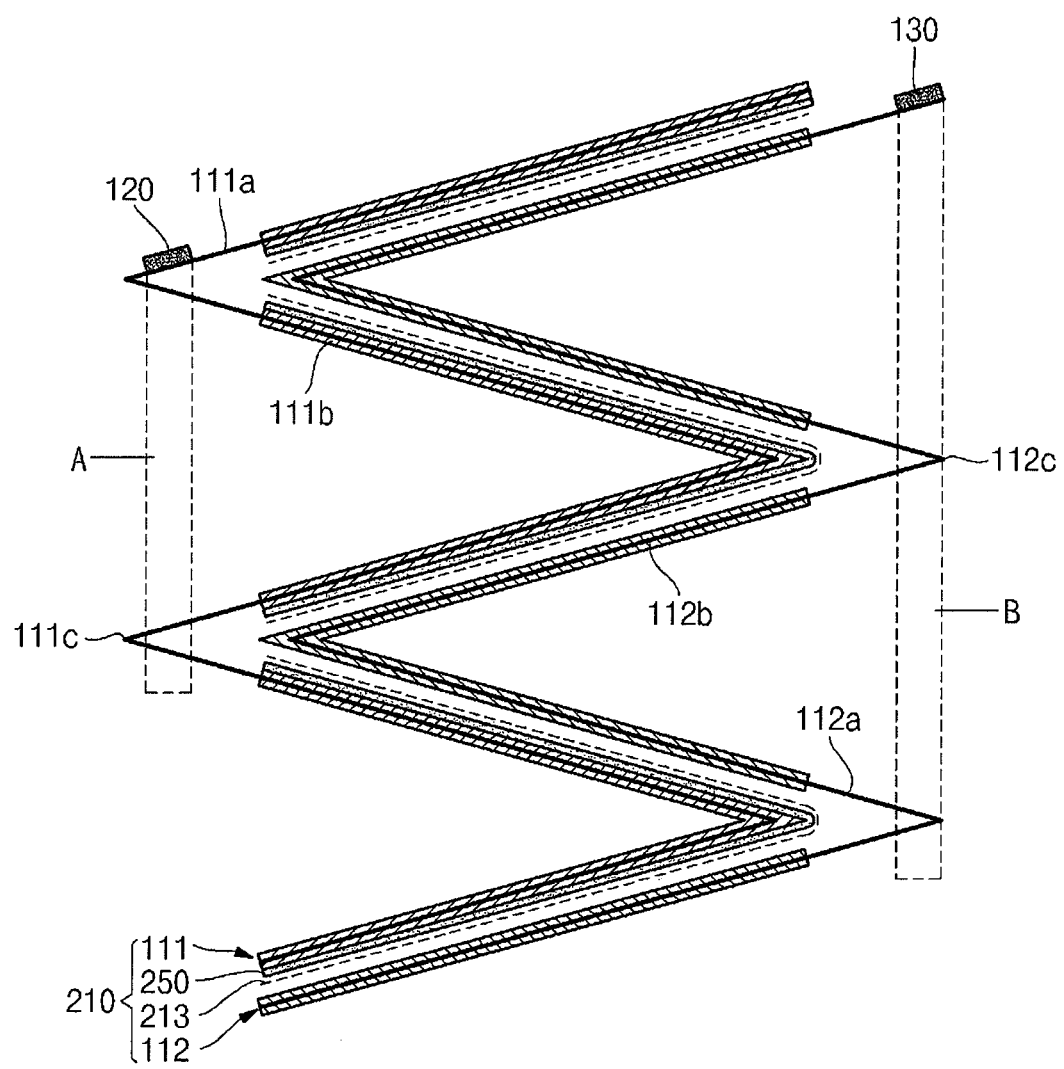
FIG. 3 is a cross-sectional view illustrating an electrode assembly of a secondary battery according to another embodiment, in which electrode tabs are attached to the electrode assembly.
Figure 4:
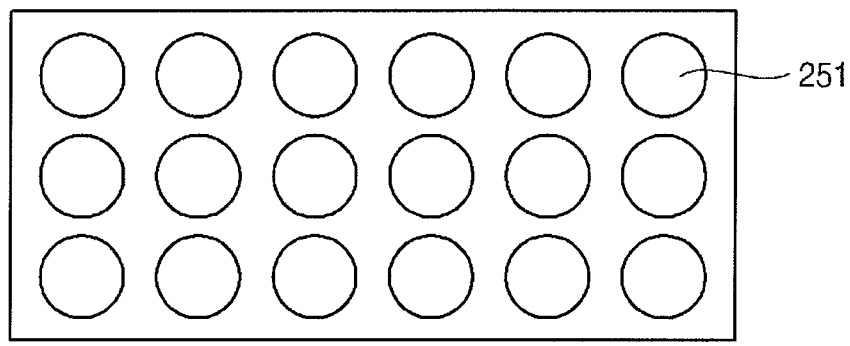
FIG. 4 is a plan view illustrating adhesive of FIG. 3.

FIG. 3 is a cross-sectional view illustrating an electrode assembly of a secondary battery according to another embodiment, in which electrode tabs are attached to the electrode assembly. FIG. 4 is a plan view illustrating the adhesive of FIG. 3. The secondary battery according to the current embodiment is the same as the previously described embodiment except for a separator. Thus, the secondary battery according to the current embodiment will now be described with respect to the differences from the secondary battery according to the previously described embodiment. In addition, like reference numerals denote like elements in the previous embodiment and the current embodiment, and thus descriptions thereof will be omitted.

Referring to FIG. 3, an electrode assembly 210 according to an embodiment includes separators 213 that are disposed only in the regions where the positive electrode active materials 111b face the negative electrode active materials 112b. Thus, the entire area of the separators 213 may be equal to the entire area of the positive electrode active materials 111b or the negative electrode active materials 112b facing the separator 213. The separators 213 may be adhered to the positive electrode active materials 111b or the negative electrode active materials 112b through adhesives 250.

Hole-shaped ion passages 251 may pass through the adhesives 250 from their upper surfaces to their lower surfaces. The ion passages 251 of the adhesives 250 provide passages through which lithium ions move. Furthermore, the ion passages 251 may be impregnated with electrolyte. Thus, the ion passages 251 may have an appropriate size to pass the electrolyte and the lithium ions and provide a contact area for fixing the separators 213 to an active material layer.

A secondary battery according to another embodiment will now be described with reference to FIG. 5.

Figure 5:
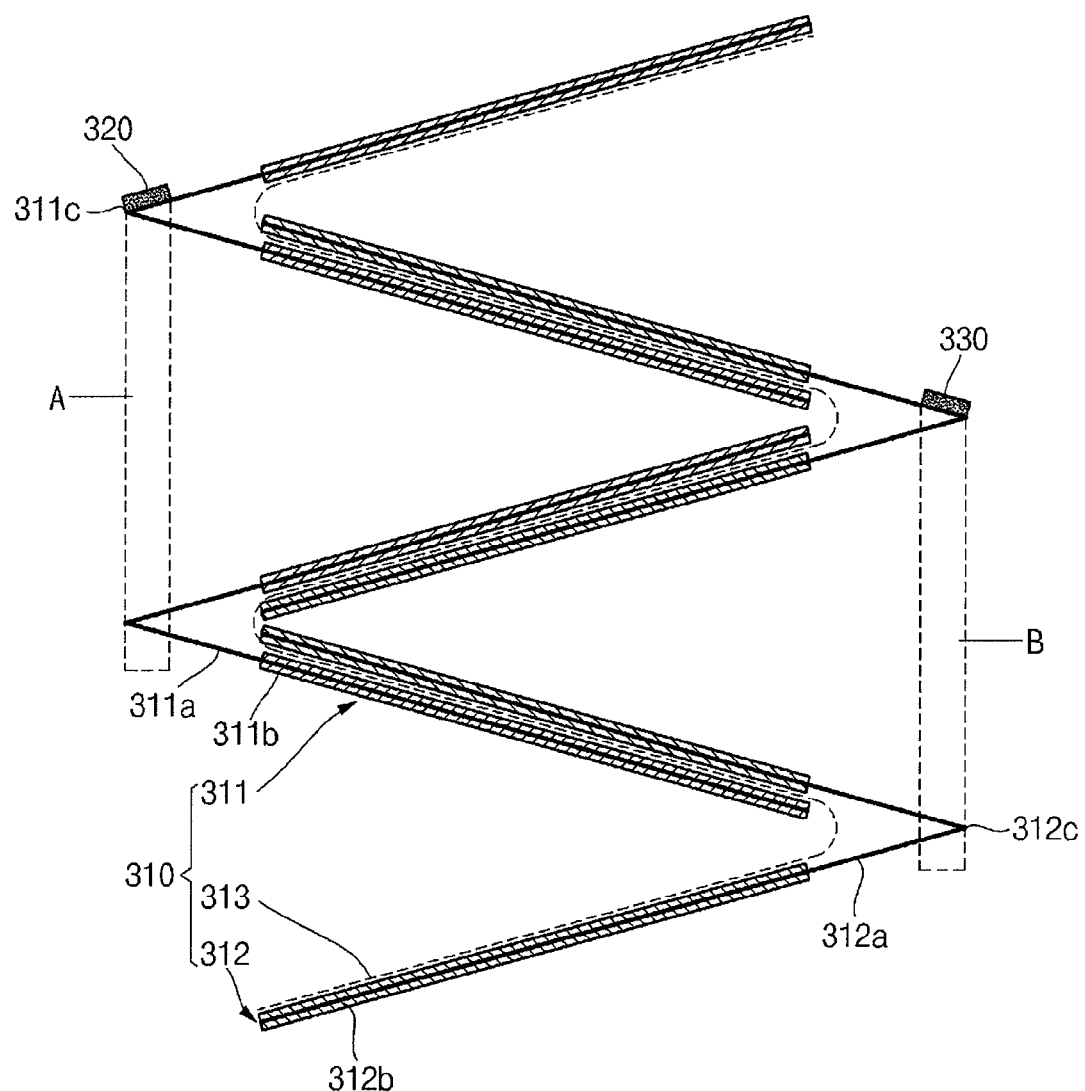
FIG. 5 is a cross-sectional view illustrating an electrode assembly of a secondary battery according to another embodiment, in which electrode tabs are attached to the electrode assembly.

FIG. 5 is a cross-sectional view illustrating an electrode assembly of a secondary battery according to another embodiment, in which electrode tabs are attached to the electrode assembly.

Referring to FIG. 5, an electrode assembly 310 may include a plurality of positive electrode plates 311, a plurality of negative electrode plates 312, and a separator 313.

The separator 313 may be disposed between the positive electrode plates 311 and the negative electrode plates 312. The positive electrode plates 311 and the negative electrode plates 312 may be stacked to form the electrode assembly 310. At this point, the positive electrode plates 311 may overlap the negative electrode plates 312.

The positive electrode plates 311 may have a plurality of plate shapes. Each of the positive electrode plates 311 may include positive electrode active material regions 311b at the upper and lower sides of a first positive electrode bent portion 311c formed by bending a positive electrode non-coating portion 311a. That is, the positive electrode plate 311 may include the positive electrode non-coating portion 311a formed in the center thereof, and the positive electrode active material regions 311b formed at the upper and lower sides of the positive electrode non-coating portion 311a. The first positive electrode bent portion 311c is disposed in the longitudinal center of the positive electrode non-coating portion 311a. The upper and lower sides of the positive electrode non-coating portion 311a are positions determined when the positive electrode plates 311 are vertically arranged.

The negative electrode plates 312 may have a plurality of plate shapes. Each of the negative electrode plates 312 may include negative electrode active material regions 312b at the upper and lower sides of a first negative electrode bent portion 312c formed by bending a negative electrode non-coating portion 312a. That is, the negative electrode plate 312 may include the negative electrode non-coating portion 312a formed in the center thereof, and the negative electrode active material regions 312b formed at the upper and lower sides of the negative electrode non-coating portion 312a. The first negative electrode bent portion 312c is disposed in the longitudinal center of the negative electrode non-coating portion 312a. The upper and lower sides of the negative electrode non-coating portion 312a are positions determined when the negative electrode plates 312 are vertically arranged.

The positive electrode plates 311 and the negative electrode plates 312 may be alternately stacked such that the positive electrode active material regions 311b disposed at the lower sides of the positive electrode plates 311 overlap the negative electrode active material regions 312b disposed at the upper sides of the negative electrode plates 312, and such that the positive electrode active material regions 311b disposed at the upper sides of the positive electrode plates 311 overlap the negative electrode active material regions 312b disposed at the lower sides of the negative electrode plates 312. Thus, the negative electrode active material regions 312b of the negative electrode plates 312 face the positive electrode active material regions 311b of the positive electrode plates 311. In addition, the positive electrode plates 311 may be stacked such that the positive electrode non-coating portions 311a are directed to one side, and the negative electrode plates 312a may be stacked such that the negative electrode non-coating portions 312a are directed to the opposite side to that of the positive electrode non-coating portions 311a.

The separator 313 may be disposed between the positive electrode plates 311 and the negative electrode plates 312. The separator 313 can be a typical separator used in a secondary battery. The separator 313 may be a ceramic layer, e.g., a porous layer including material such as $Al_2O_3$, $BaTiO_4$, or $TiO_2$. The separator 313, having a single plate shape, may be bent in a zigzag shape between the positive electrode plate 311 and the second electrode plate 312. To protect the separator 313 against heat generated from a process of welding the positive electrode tab 320 and the negative electrode tab 330 to the positive electrode non-coating portion 311a and the negative electrode non-coating portion 312a, respectively, the separator 313 may be spaced apart from the bent sides 311c of the positive electrode non-coating portions 311a and the bent sides 312c of the negative electrode non-coating portions 312a, or be in close contact with the ends of the positive electrode plates 311 and the negative electrode plates 312.

The positive electrode tab 320 may be electrically connected to the positive electrode non-coating portions 311a. The positive electrode tab 320 may be connected to the positive electrode non-coating portion 311a at an uppermost portion of the electrode assembly 310. According to an embodiment, the positive electrode tab 320 may be electrically connected to the positive electrode non-coating portions 311a. In this case, the positive electrode tab 320 may be coupled to the positive electrode non-coating portions 311a at positions A that are vertically the same on the positive electrode non-coating portions 311a as illustrated in FIG. 5. The positive electrode tab 320 may be connected to one or more of the positive electrode non-coating portions 311a through welding or rivet coupling. The negative electrode tab 330 may be electrically connected to the negative electrode non-coating portions 312a. The negative electrode tab 330 may be connected to the negative electrode non-coating portion 312a at an uppermost portion of the electrode assembly 310. According to an embodiment, the negative electrode tab 330 may be electrically connected to the negative electrode non-coating portions 312a. In this case, the negative electrode tab 330 may be coupled to the negative electrode non-coating portions 312a at positions B that are vertically the same on the negative electrode non-coating portions 312a as illustrated in FIG. 5. The negative electrode tab 330 may be connected to one or more of the negative electrode non-coating portions 312a through welding or rivet coupling.

Next, a secondary battery according to another embodiment will now be described with reference to FIGS. 6 and 7.

Figure 6:
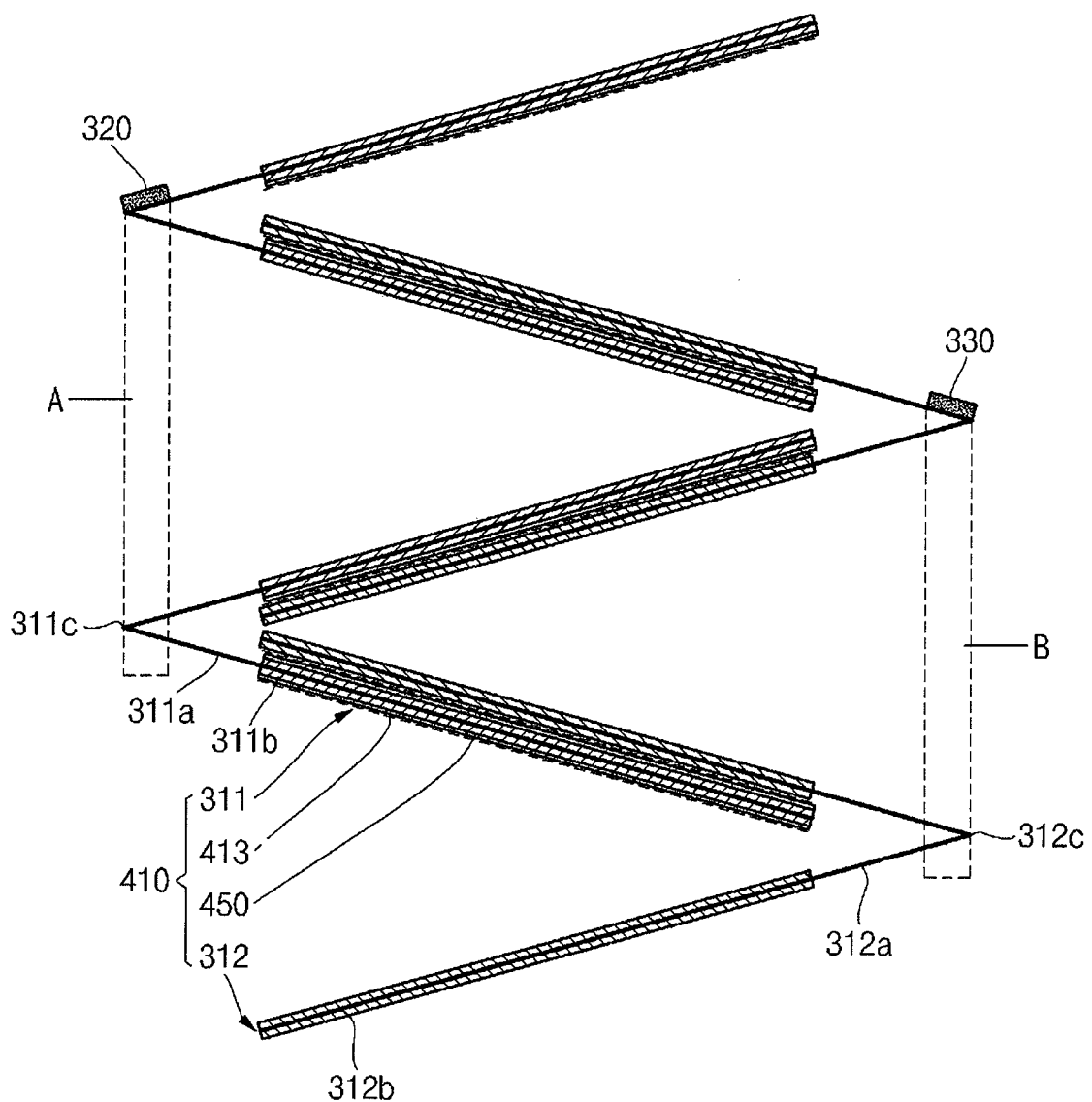
FIG. 6 is a cross-sectional view illustrating an electrode assembly of a secondary battery according to another embodiment, in which electrode tabs are attached to the electrode assembly.

FIG. 6 is a cross-sectional view illustrating an electrode assembly of a secondary battery according to another embodiment, in which electrode tabs are attached to the electrode assembly. FIG. 7 is a plan view illustrating adhesive of FIG. 6. The secondary battery according to the current embodiment is the same as the embodiment of FIG. 5, except for a separator. Thus, the secondary battery according to the current embodiment will now be described with respect to the differences from the secondary battery according to the embodiment of FIG. 5. In addition, like reference numerals denote like elements in the embodiment of FIG. 5 and the current embodiment, and thus descriptions thereof will be omitted.

Referring to FIGS. 6 and 7, an electrode assembly 410 according to an embodiment includes separators 413 that are disposed only in the regions where the positive electrode active materials 311b face the negative electrode active materials 312b. Thus, the entire area of the separators 413 may be equal to the entire area of the positive electrode active materials 311b or the negative electrode active materials 312b. The separators 413 may be adhered to the positive electrode active materials 311b or the negative electrode active materials 312b through adhesives 450.

Hole-shaped ion passages 451 may pass through the adhesives 450 from their upper surfaces to their lower surfaces. The ion passages 251 of the adhesives 250 provide passages through which lithium ions move. Furthermore, the ion passages 451. The ion passages 451 may be impregnated with electrolyte. Thus, the ion passages 451 may have an appropriate size to pass the electrolyte and the lithium ions and provide a contact area for fixing the separators 413 to an active material layer.

Hereinafter, a method of manufacturing a secondary battery configured as described above will now be described. The method may include a preparing operation, a connecting operation, and a storing operation.

In a preparing operation according to an embodiment, an electrode assembly is prepared by stacking and bending a positive electrode plate, a negative electrode plate, and a separator disposed between the positive electrode plate and negative electrode plate. At this point, first positive electrode bent portions of a plurality of positive electrode non-coating portions may be disposed at a side, and first negative electrode bent portions of a plurality of negative electrode non-coating portions may be disposed at another side. The preparing operation is varied according to the structures of the secondary batteries of the previous embodiments, and thus, the preparing operation will be described according to each of the previously described embodiments.

In a connecting operation according to an embodiment, a positive electrode tab is electrically connected to a plurality of positive electrode non-coating portions, and a negative electrode tab is electrically connected to a plurality of negative electrode non-coating portions.

In a storing operation according to an embodiment, a portion of a positive electrode tab and a portion of a negative electrode tab are exposed to the outside, and an electrode assembly is stored in a battery case.

Hereinafter, a method of manufacturing the secondary battery 1 according the embodiment of FIG. 2 will now be described with reference to the accompanying drawings. FIGS. 8A through 8E are cross-sectional views illustrating a method of manufacturing the secondary battery 1 according the embodiment of FIG. 1. Like reference numerals denote like elements in FIG. 2 and FIGS. 8A through 8F.

First, referring to FIG. 8A, the positive electrode plate 111 can include the positive electrode non-coating portions 111a that are spaced a constant distance from each other, and the positive electrode active material regions 111b that are formed through coating between the positive electrode non-coating portions 111a. The positive electrode plate 111 has a zigzag shape with the bent positive electrode non-coating portions 111a and the bent positive electrode active material regions 111b. The positive electrode non-coating portions 111a may be formed by coating a positive electrode collection plate with the positive electrode active material regions 111b at a constant interval.

The negative electrode plate 112 can include the negative electrode non-coating portions 112a that are spaced a constant distance from each other, and the negative electrode active material regions 112b that are formed through coating between the negative electrode non-coating portions 112a. The negative electrode plate 112 may be bent to have a zigzag shape with the bent negative electrode non-coating portions 112a and the bent negative electrode active material regions 112b. The negative electrode non-coating portions 112a may be formed by coating a negative electrode collection plate with the negative electrode active materials 112b such that the negative electrode active materials 112b at a constant interval.

Next, referring to FIG. 8B, the separator 113 may be disposed at the opposite side to the positive electrode non-coating portions 111a, and be in contact with an end of the positive electrode plate 111.

Figure 8C:
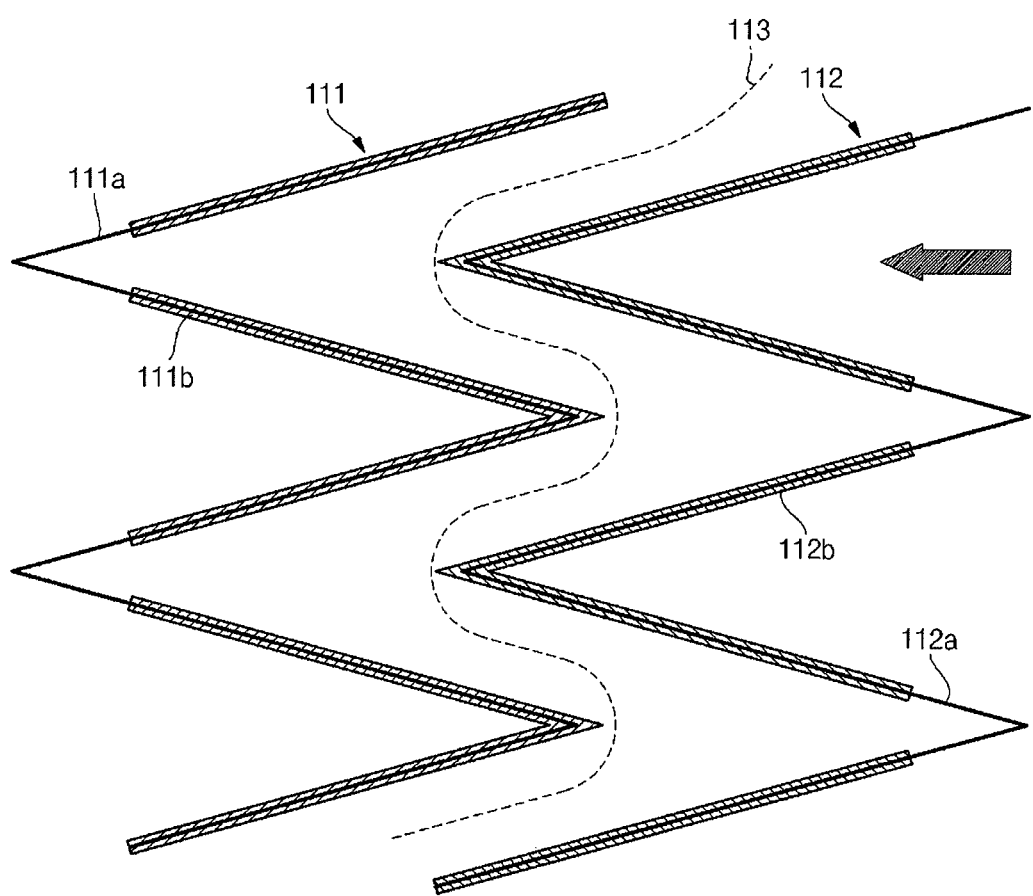
Figure 8D:
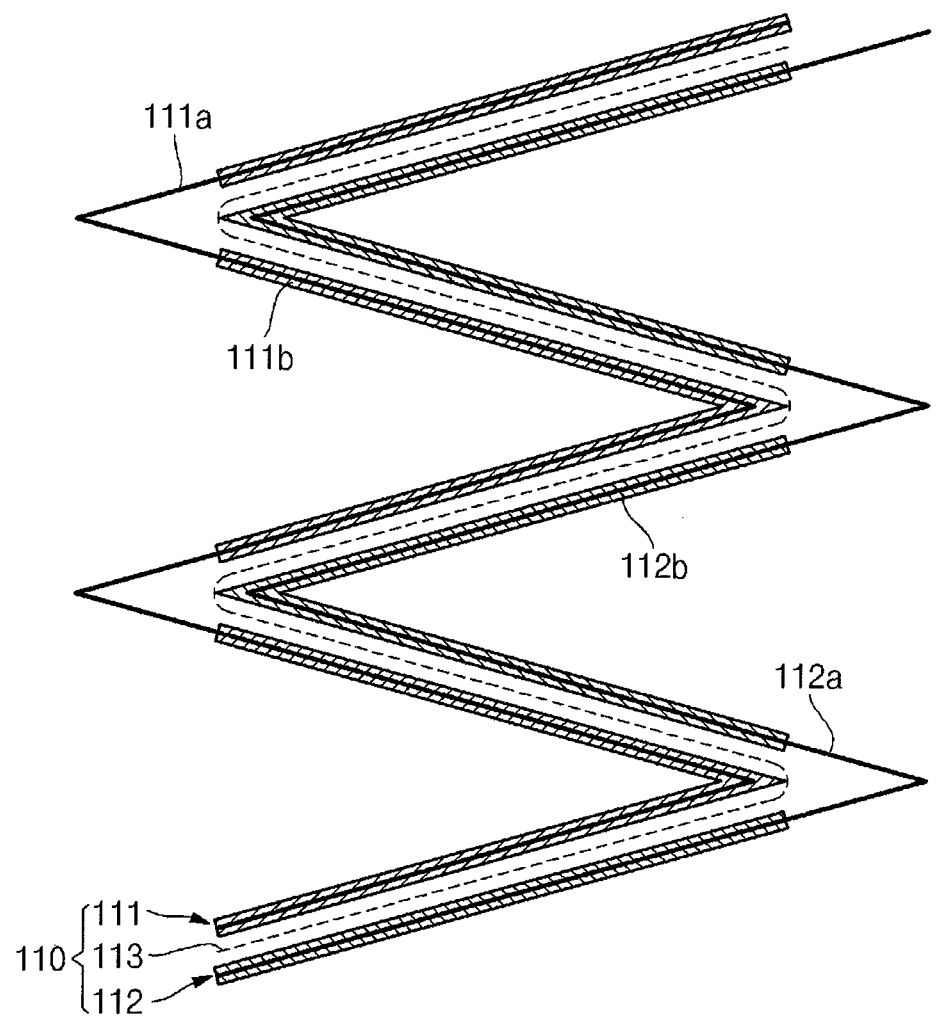

Next, referring to FIG. 8C, the negative electrode active material regions 112b may be overlapped with the positive electrode active material regions 111b to bring the separator 113 in close contact with the upper surfaces of the positive electrode active material regions 111b. At this point, the negative electrode plate 112 may be pushed into the positive electrode plate 111 until the entire area of the negative electrode active material regions 112b faces the entire area of the positive electrode active material regions 111b. Thus, as illustrated in FIG. 8D, the separator 113 may be disposed in the regions where the negative electrode active material regions 112b face the positive electrode active material regions 111b.

Figure 8E:
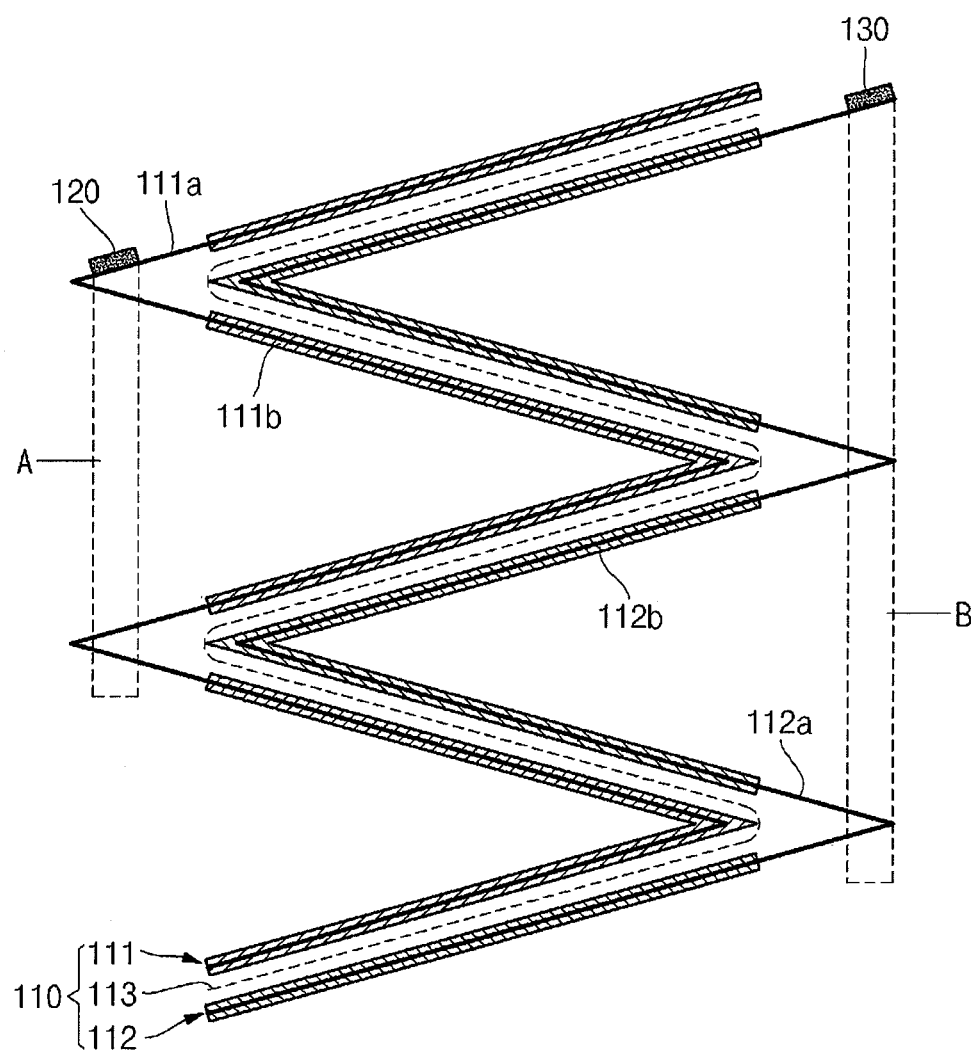

Next, referring to FIG. 8E, a side of the positive electrode tab 120 can be electrically connected to the positive electrode non-coating portion 111a, and a side of the negative electrode tab 130 can be electrically connected to the negative electrode non-coating portion 112a. At this point, the positive electrode tab 120 may be welded to the positive electrode non-coating portions 111a, and the negative electrode tab 130 may be welded to the negative electrode non-coating portions 112a.

Figure 8F:
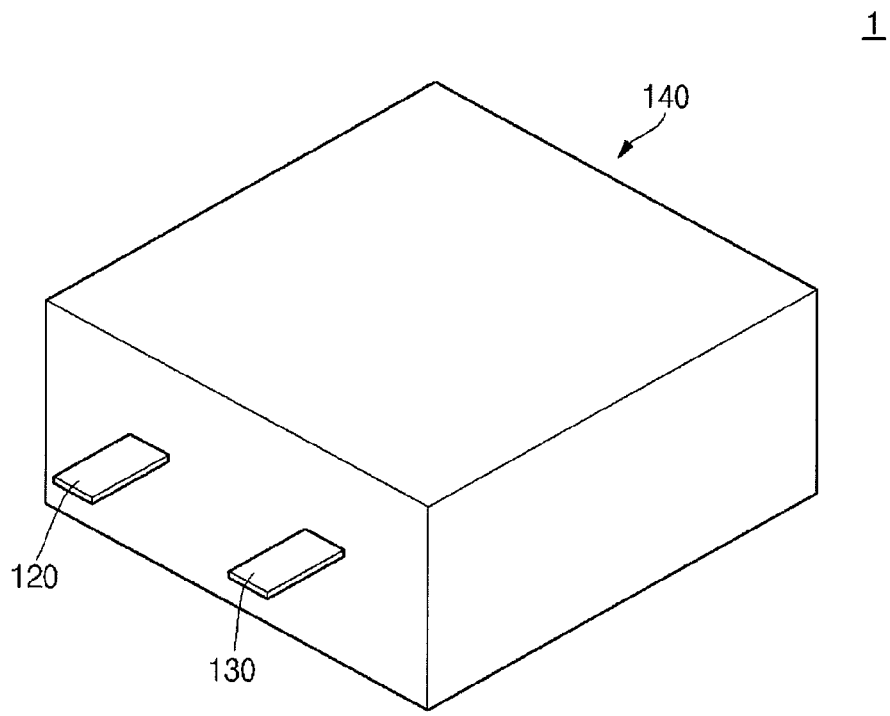

Next, referring to FIG. 8F, another side of the positive electrode tab 120 and another side of the negative electrode tab 130 can be exposed to the outside, and the electrode assembly 110 can be stored in the battery case 140. Thus, the positive electrode tab 120 connected to the positive electrode plate 111, and the negative electrode tab 130 connected to the negative electrode plate 112 can function as electrode terminals.

Figure 9A:
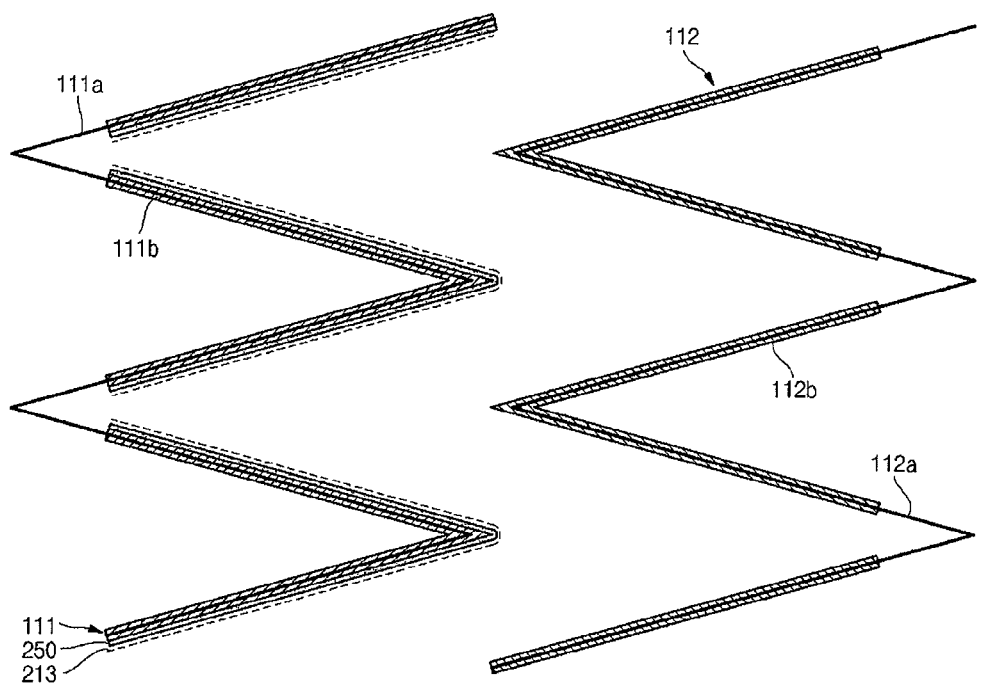
FIGS. 9A and 9B are cross-sectional views illustrating a method of manufacturing the electrode assembly of the secondary battery according the embodiment of FIG. 3.
Figure 9B:
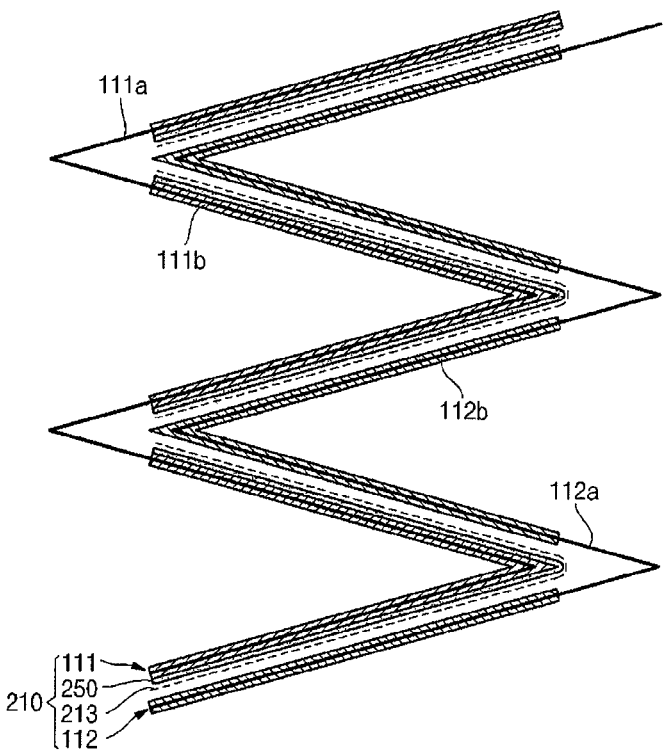

Hereinafter, a method of manufacturing the secondary battery according the embodiment of FIG. 3 will now be described with reference to FIGS. 9A and 9B. In a manner similar to the embodiment of FIG. 2, a positive electrode tab can be connected to positive electrode non-coating portions, a negative electrode tab can be connected to negative electrode non-coating portions, and an electrode assembly can be stored in a battery case. Thus, descriptions thereof will be omitted. That is, the method of manufacturing the secondary battery according the embodiment of FIG. 3 will be described with respect to a process of forming an electrode assembly. FIGS. 9A and 9B are cross-sectional views illustrating a method of manufacturing the electrode assembly of the secondary battery according the embodiment of FIG. 3. Like reference numerals denote like elements in FIGS. 3 and 4, and FIGS. 9A and 9B.

First, referring to FIG. 9A, the positive electrode non-coating portions 111a of the positive electrode plate 111 may be spaced a constant distance from each other, and the separators 213 may be attached to the upper portions of the positive electrode active material regions 111b through the adhesives 250. The positive electrode plate 111 can have a zigzag shape by bending each of the portions between the positive electrode non-coating portions 111a and the positive electrode active material regions 111b. The negative electrode non-coating portions 112a of the negative electrode plate 112 may be spaced a constant distance from each other. The negative electrode plate 112 can have a zigzag shape by bending each of the portions between the negative electrode non-coating portions 112a and the negative electrode active material regions 112b.

Next, referring to FIG. 9B, the positive electrode non-coating portions 111a of the positive electrode plate 111, and the negative electrode non-coating portions 112a of the negative electrode plate 112 may be directed to opposite sides, and the entire area of the positive electrode active materials 111b may correspond to the entire area of the negative electrode active materials 112b.

Hereinafter, a method of manufacturing the secondary battery according the embodiment of FIG. 5 will now be described with reference to the accompanying drawings. Here, the descriptions made in the embodiment of FIG. 2 will be omitted or summarized. That is, in a manner similar to the embodiment of FIG. 2, a positive electrode tab may be connected to positive electrode non-coating portions, a negative electrode tab may be connected to negative electrode non-coating portions, and an electrode assembly may be stored in a battery case. Thus, descriptions thereof will be omitted. That is, the method of manufacturing the secondary battery according the embodiment of FIG. 5 will be described with respect to a process of forming an electrode assembly. FIGS. 10A through 10D are cross-sectional views illustrating a method of manufacturing the electrode assembly of the secondary battery according to the embodiment of FIG. 5. Like reference numerals denote like elements in FIG. 5, and FIGS. 10A through 10D.

Figure 10A:
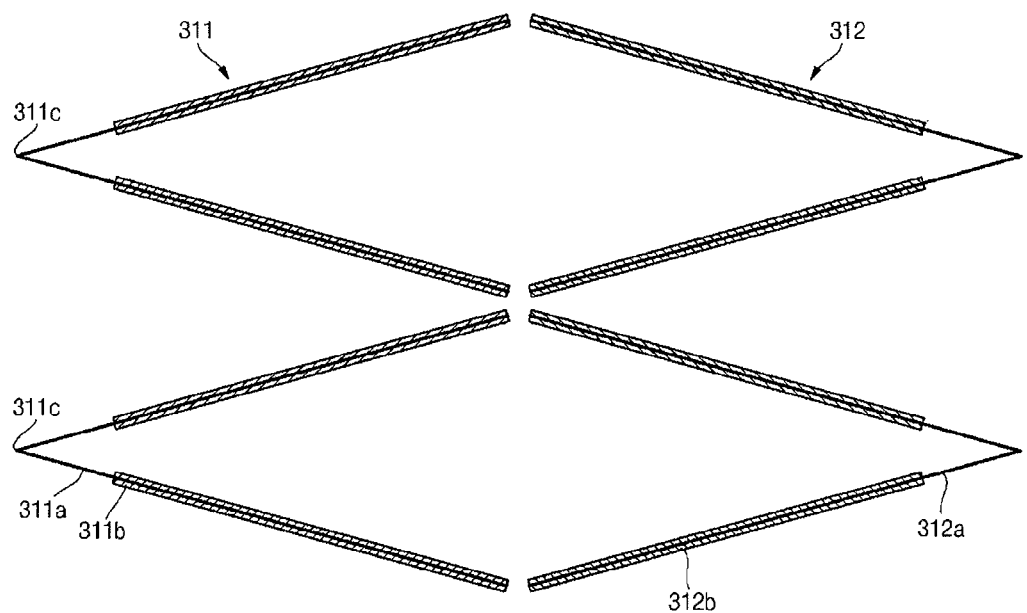
FIGS. 10A through 10D are cross-sectional views illustrating a method of manufacturing the electrode assembly of the secondary battery according to the embodiment of FIG. 5.

First, referring to FIG. 10A, first positive electrode bent portions 311c may be formed by bending the positive electrode non-coating portions 311a disposed between the positive electrode active material regions 311b. Thus, the positive electrode active material regions 311b are disposed at the upper and lower sides of the first positive electrode bent portions 311c. First negative electrode bent portions 312c may be formed by bending the negative electrode non-coating portions 312a disposed between the negative electrode active material regions 312b. Thus, the negative electrode active material regions 312b are disposed at the upper and lower sides of the negative electrode non-coating portions 312a.

Figure 10B:
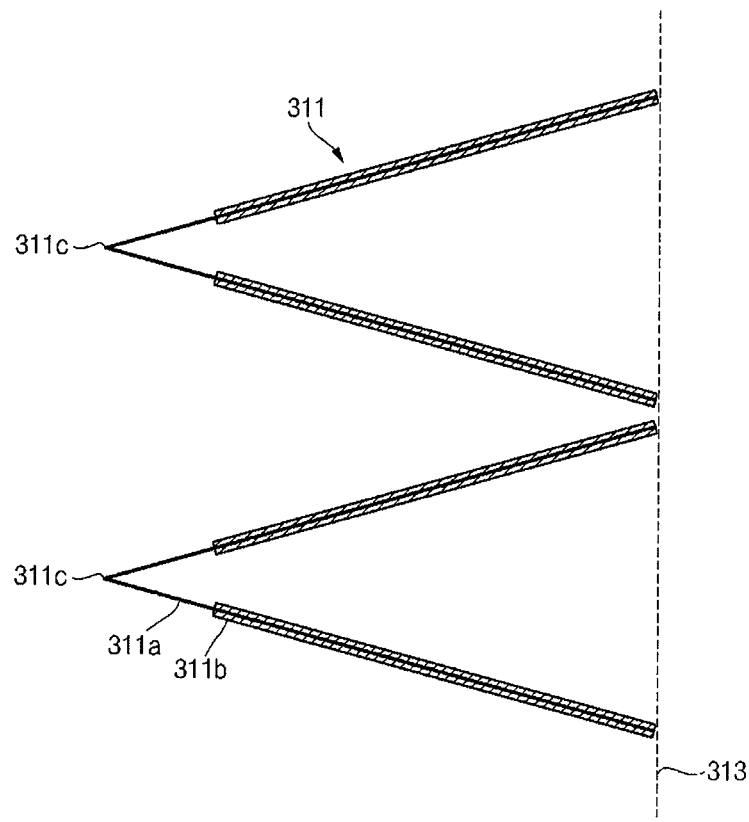

Next, referring to FIG. 10B, the positive electrode plates 311 may be sequentially stacked to direct the positive electrode non-coating portions 311a to the same side. At this point, the first positive electrode bent portions 311c of the positive electrode non-coating portions 311a may be disposed on an identical vertical surface, and the separator 313 may be disposed at the ends of the positive electrode plates 311.

Figure 10C:
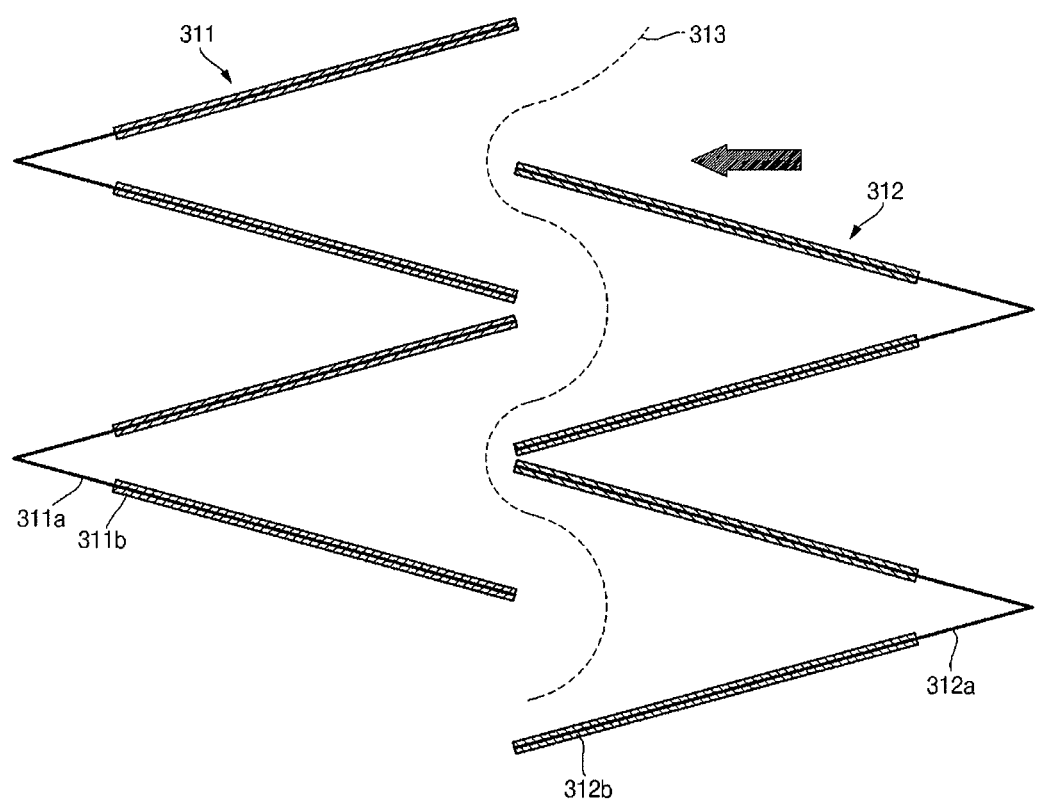
Figure 10D:
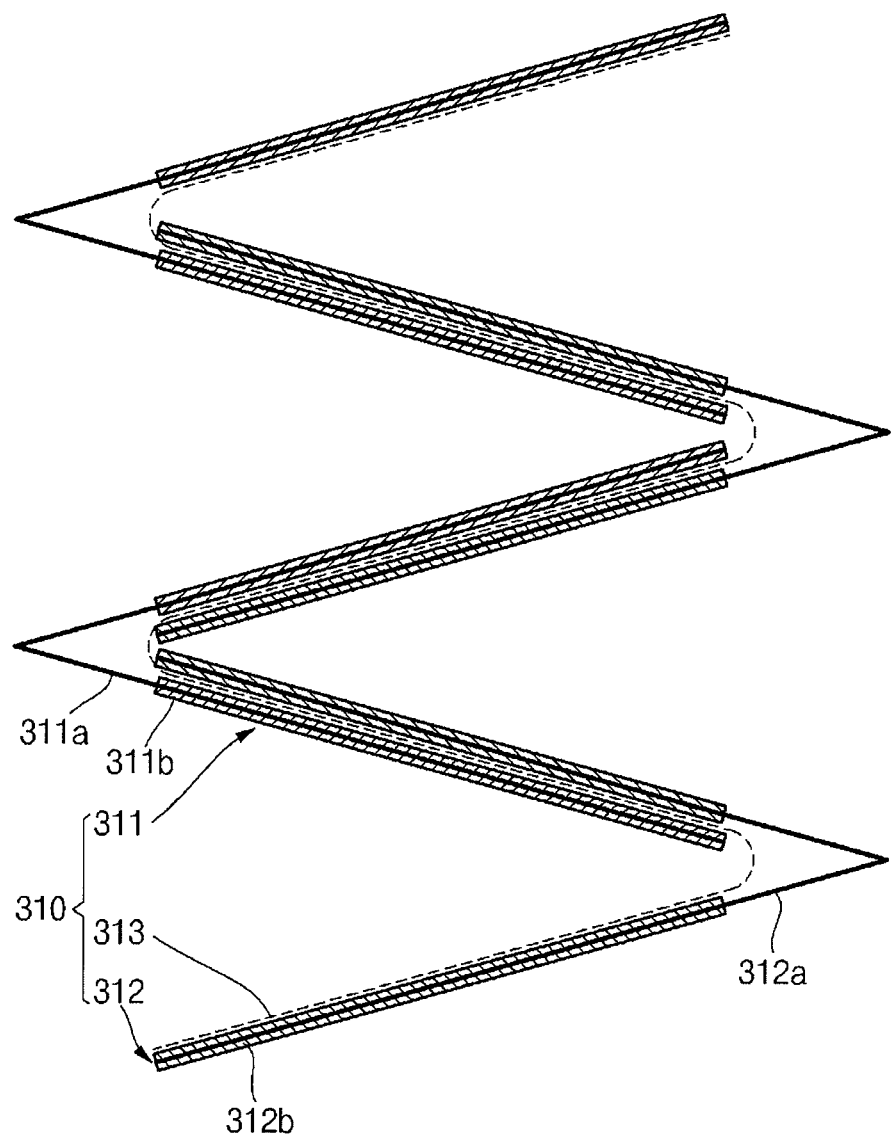

Next, referring to FIG. 10C, when the negative electrode active material regions 312b are overlapped with the positive electrode active material regions 311b, the separator 313 can be in close contact with the upper portions of the positive electrode active material regions 311b. At this point, the negative electrode plate 312 may be pushed into the positive electrode plate 311 until the entire area of the negative electrode active material regions 312b faces the entire area of the positive electrode active material regions 311b. Thus, as illustrated in FIG. 10D, the separator 113 may be disposed in the regions where the negative electrode active material regions 312b face the positive electrode active material regions 311b.

Figure 11A:
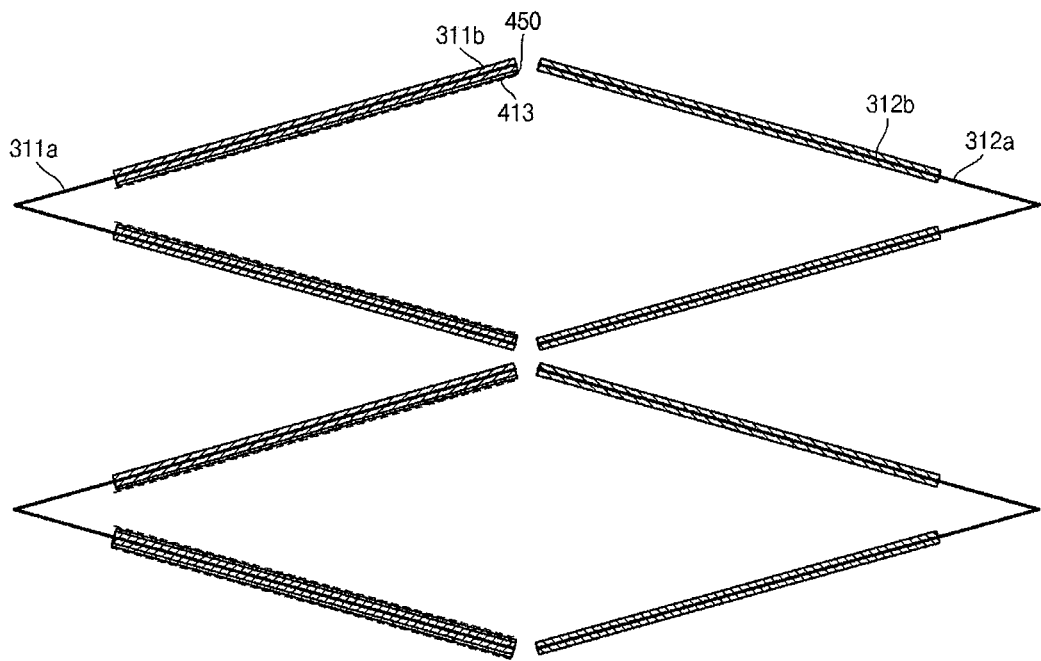
FIGS. 11A and 11B are cross-sectional views illustrating a method of manufacturing the electrode assembly of the secondary battery according to the embodiment of FIG. 6.
Figure 11B:
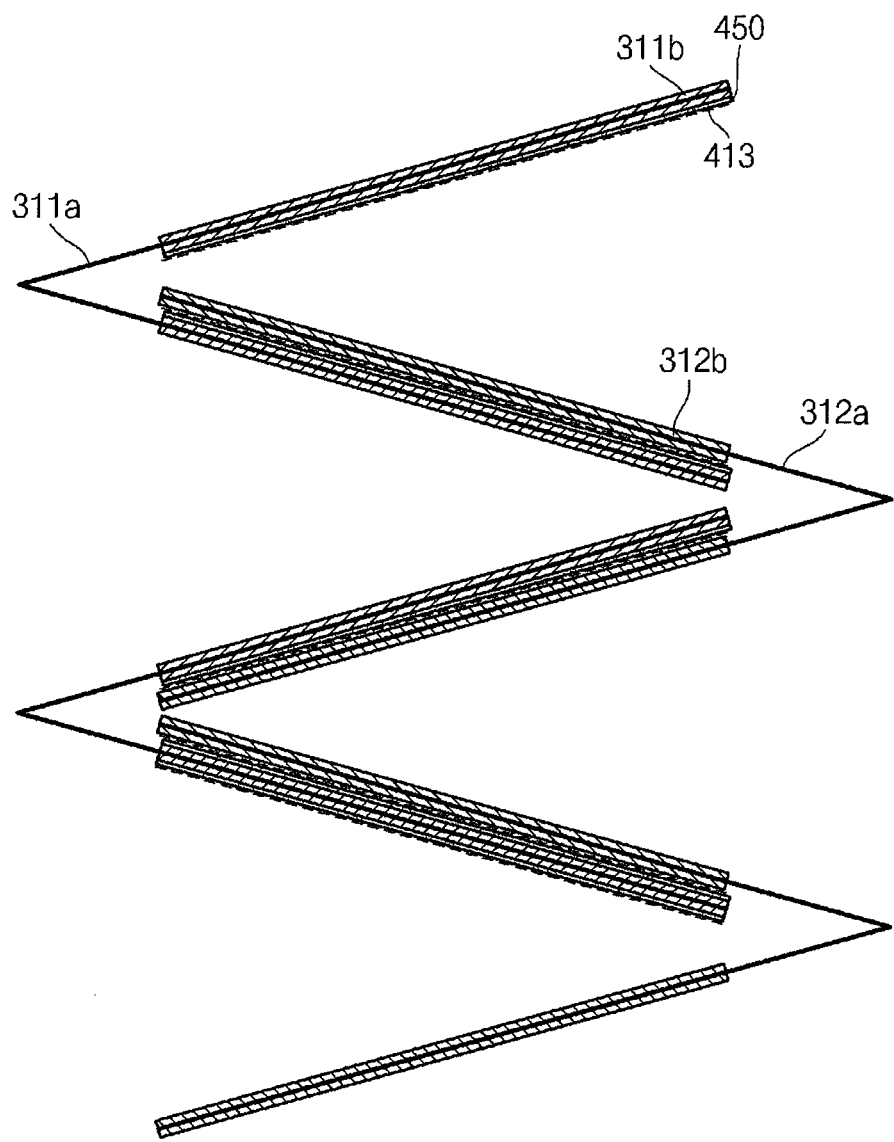

Hereinafter, a method of manufacturing the secondary battery according the embodiment of FIG. 6 will now be described with reference to the accompanying drawings. In the similar manner to the embodiment of FIG. 2, a positive electrode tab may be connected to positive electrode non-coating portions, a negative electrode tab may be connected to negative electrode non-coating portions, and an electrode assembly may be stored in a battery case. Thus, descriptions thereof will be omitted. Furthermore, the descriptions made in the embodiment of FIG. 5 will be omitted or summarized. That is, the method of manufacturing the secondary battery according the embodiment of FIG. 6 will be described with respect to a process of forming an electrode assembly. FIGS. 11A and 11B are cross-sectional views illustrating a method of manufacturing the electrode assembly of the secondary battery according to the embodiment of FIG. 6. Like reference numerals denote like elements in FIGS. 6 and 7, and FIGS. 11A and 11B.

First, referring to FIG. 11A, the positive electrode plates 311 may be formed by forming the positive electrode active material regions 311b on both sides of the positive electrode non-coating portions 311a, by attaching the separators 413 to the upper portions of the positive electrode active materials 311b through the adhesives 450, and by bending the positive electrode non-coating portions 311a. The negative electrode plates 312 may be formed by forming the negative electrode active material regions 312b on both sides of the negative electrode non-coating portions 312a, and by bending the negative electrode non-coating portions 312a.

Next, the positive electrode plates 311 and the negative electrode plates 312 may be stacked such that the positive electrode non-coating portions 311a and the negative electrode non-coating portions 312a are directed to the opposite sides, and such that the entire area of the positive electrode active materials 311b corresponds to the entire area of the negative electrode active materials 312b.

According to the embodiments, the inner space of the battery case receiving the electrode assembly can be reduced to miniaturize the secondary battery.

Embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
an electrode assembly including a positive electrode plate, a negative electrode plate, and a separator,
wherein the positive electrode plate and the negative electrode plate are stacked with the separator disposed between,
wherein the positive electrode plate includes a plurality of positive electrode non-coating portions interposed between a plurality of positive electrode active material regions, wherein the plurality of positive electrode non-coating portions include including a plurality of first positive electrode bent portions at a first side of the electrode assembly, and wherein the plurality of positive electrode active material regions include a plurality of second positive electrode bent portions at a second side of the electrode assembly opposite the first side,
wherein the negative electrode plate includes a plurality of negative electrode non-coating portions interposed between a plurality of negative electrode active material regions, wherein the plurality of negative electrode non-coating portions include including a plurality of first negative electrode bent portions at the second side of the electrode assembly, and wherein the plurality of negative electrode active material regions include a plurality of second negative electrode bent portions at the first side of the electrode assembly, such that a first negative electrode bent portion of the plurality of first negative electrode bent portions is adjacent with a second positive electrode bent portion of the plurality of second positive electrode bent portions on the second side, and that a second negative electrode bent portion of the plurality of second negative electrode bent portions is adjacent with a first positive electrode bent portion of the plurality of first positive electrode bent portions on the first side;

a positive electrode tab electrically connected to one of the plurality of positive electrode non-coating portions wherein the positive electrode tab is coupled to only one of the plurality of first positive electrode bent portions; and a negative electrode tab electrically connected to one of the plurality of negative electrode non-coating portions wherein the negative electrode tab is coupled to only one of the plurality of first negative electrode bent portions, wherein the positive electrode plate and the negative electrode plate have a zigzag shape.

2. The secondary battery as claimed in claim 1, wherein the positive electrode plate has a plate shape and includes the positive electrode non-coating portions at a constant interval, wherein the negative electrode plate has a plate shape and includes the negative electrode non-coating portions at a constant interval.

3. The secondary battery as claimed in claim 1, wherein the positive electrode plate comprises a plurality of plate shapes, wherein each of the plurality of plate shapes includes positive electrode active material regions disposed at upper and lower sides of one of the plurality of first positive electrode bent portions, wherein the negative electrode plate comprises a plurality of plate shapes, wherein each of the plurality of plate shapes includes negative electrode active material regions disposed at upper and lower sides of one of the plurality of first negative electrode bent portions, and wherein the positive electrode plate and the negative electrode plate are alternately stacked such that the positive electrode active material regions disposed at the upper sides overlap the negative electrode active material regions disposed at the lower sides, and such that the positive electrode active material regions disposed at the lower sides overlap the negative electrode active material regions disposed at the upper sides.

4. The secondary battery as claimed in claim 1, wherein the separator comprises a ceramic layer.

5. The secondary battery as claimed in claim 2, wherein the separator has a plate shape and is bent in a zigzag shape between the positive electrode plate and the negative electrode plate.

6. The secondary battery as claimed in claim 3, wherein the separator has a plate shape and is bent in a zigzag shape between the positive electrode plate and the negative electrode plate.

7. The secondary battery as claimed in claim 1, wherein the separator is spaced apart from one of the plurality of first positive electrode bent portions and one of the plurality of first negative electrode bent portions.

8. The secondary battery as claimed in claim 2, wherein the separator is disposed only in a region where the positive electrode active material region faces the negative electrode active material region.

9. The secondary battery as claimed in claim 3, wherein the separator is disposed only in a region where the positive electrode active material region faces the negative electrode active material region.

10. The secondary battery as claimed in claim 8, wherein the separator is adhered to the positive electrode active material region by an adhesive.

11. The secondary battery as claimed in claim 9, wherein the separator is adhered to one of the plurality of negative electrode active material regions by an adhesive.

12. The secondary battery as claimed in claim 10, wherein the adhesive comprises an ion passage that passes through an upper surface and a lower surface of the adhesive.

13. The secondary battery as claimed in claim 11, wherein the adhesive comprises an ion passage that passes through an upper surface and a lower surface of the adhesive.

14. The secondary battery as claimed in claim 1, wherein the positive electrode tab is welded or riveted to the positive electrode non-coating portions, and the negative electrode tab is welded or riveted to the negative electrode non-coating portions.

15. The secondary battery as claimed in claim 1, wherein the positive electrode tab is welded or riveted to the positive electrode non-coating portions, and the negative electrode tab is welded or riveted to the negative electrode non-coating portions through rivet coupling.

16. The secondary battery as claimed in claim 1, further comprising a battery case that exposes a portion of the positive electrode tab and a portion of the negative electrode tab to an exterior of the battery case and receives the electrode assembly.

17. A method of manufacturing a secondary battery, the method comprising:

preparing an electrode assembly including a positive electrode plate, a negative electrode plate, and a separator, the positive electrode plate comprising a plurality of positive electrode non-coating portions interposed between a plurality of positive electrode active material regions, and the negative electrode plate comprising a plurality of negative electrode non-coating portions interposed between a plurality of negative electrode active material regions, wherein the positive electrode plate and the negative electrode plate are stacked with the separator disposed in between, wherein a plurality of first positive electrode bent portions of one of the plurality of positive electrode non-coating portions are disposed at a first side of the electrode assembly, a plurality of second positive electrode bent portions of one of the plurality of positive electrode active material regions are disposed at a second side of the electrode assembly, a plurality of first negative electrode bent portions of one of the plurality of negative electrode non-coating portions are disposed at the second side of the electrode assembly, and a plurality of second negative electrode bent portions of one of the plurality of negative electrode active material regions are disposed at the first side of the electrode assembly, such that a first negative electrode bent portion of the plurality of first negative electrode bent portions is adjacent with a second positive electrode bent portion of the plurality of second positive electrode bent portions on the second side, and that a second negative electrode bent portion of the plurality of second negative electrode bent portions is adjacent with a first positive electrode bent portion of the plurality of first positive electrode bent portions on the first side;

electrically connecting a side of a positive electrode tab and a negative electrode tab to one of the plurality of positive electrode non-coating portions and one of the plurality of negative electrode non-coating portions, respectively one of the plurality of positive electrode non-coating portions wherein the positive electrode tab is coupled to only one of the plurality of first positive electrode bent portions and wherein the negative electrode tab is coupled to only one of the plurality of first negative electrode bent portions;

storing the electrode assembly in a battery case; and exposing a portion of the positive electrode tab and a portion of the negative electrode tab to an exterior of the battery case, wherein the positive electrode plate and the negative electrode plate have a zigzag shape.

18. The method as claimed in claim 17, wherein preparing the electrode assembly comprises:

providing the positive electrode non-coating portions at a constant interval on the positive electrode plate, providing the negative electrode non-coating portions at a constant interval on the negative electrode plate; and bending the separator in a zigzag shape between the positive electrode plate and the negative electrode plate, wherein the separator has a plate shape.

19. The method as claimed in claim 17, wherein preparing the electrode assembly comprises:

configuring the positive electrode plate to have a plurality of plate shapes;

providing the positive electrode active material regions on each of the plurality of plate shapes such that the positive electrode active material regions are disposed at upper and lower sides of one of the plurality of first positive electrode bent portions;

configuring the negative electrode plate to have a plurality of plate shapes;

providing the negative electrode active material regions on each of the plurality of plate shapes such that the negative electrode active material regions are disposed at upper and lower sides of one of the plurality of first negative electrode bent portions;

alternately stacking the positive electrode plate and the negative electrode plate such that the positive electrode active material regions disposed at the upper sides overlap the negative electrode active material regions disposed at the lower sides, and such that the positive electrode active material regions disposed at the lower sides overlap the negative electrode active material regions disposed at the upper sides; and disposing the separator only in a region where the positive electrode active material region faces the negative electrode active material region.

\* \* \* \* \*